US009147031B2

(12) United States Patent
Radens et al.

(10) Patent No.: US 9,147,031 B2
(45) Date of Patent: *Sep. 29, 2015

(54) ANALYSIS OF CHIP-MEAN VARIATION AND INDEPENDENT INTRA-DIE VARIATION FOR CHIP YIELD DETERMINATION

(71) Applicant: INTERNATIONAL BUSINESS MACHINES CORPORATION, Armonk, NY (US)

(72) Inventors: Carl J. Radens, Lagrangeville, NY (US); Amith Singhee, Yonkers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/755,726

(22) Filed: Jan. 31, 2013

(65) Prior Publication Data
US 2014/0173547 A1 Jun. 19, 2014

Related U.S. Application Data

(63) Continuation of application No. 13/716,283, filed on Dec. 17, 2012, now abandoned.

(51) Int. Cl.
G06F 17/50 (2006.01)
G11C 29/56 (2006.01)

(52) U.S. Cl.
CPC ........ *G06F 17/5081* (2013.01); *G06F 17/5036* (2013.01); *G11C 29/56008* (2013.01)

(58) Field of Classification Search
CPC .......... G06F 17/30; G06F 17/50; H01L 22/20
USPC .......... 716/56, 54, 55; 703/2, 14; 702/81, 179
See application file for complete search history.

(56) References Cited

U.S. PATENT DOCUMENTS

| 6,978,229 | B1* | 12/2005 | Saxena et al. ...................... 703/4 |
| 7,920,992 | B2 | 4/2011 | Rutenbar et al. |
| 7,945,887 | B2 | 5/2011 | Lu |
| 8,000,826 | B2 | 8/2011 | Luo et al. |
| 2005/0273308 | A1* | 12/2005 | Houston ......................... 703/14 |

(Continued)

OTHER PUBLICATIONS

Boning, D., et al. "Models of Process Variations in Device and Interconnect" Design of High Performance Microprocessor Circuits, Chapter 6. Dec. 2000. (21 Pages).

(Continued)

*Primary Examiner* — Mohammed Alam
(74) *Attorney, Agent, or Firm* — Tutunjian & Bitetto, P.C.; Preston J. Young

(57) ABSTRACT

Systems and methods for determining a chip yield are disclosed. One system includes a first level integration solver and a second level integration solver. The first level integration solver is configured to obtain a first probability distribution function modeling variations within a chip and to perform a discontinuous first level integration with the first probability distribution function. In addition, the second level integration solver is implemented by a hardware processor and is configured to perform a continuous second level integration based on a second probability distribution function modeling variations between dies to determine the chip yield.

8 Claims, 6 Drawing Sheets

(56) References Cited

U.S. PATENT DOCUMENTS

| | | | |
|---|---|---|---|
| 2007/0118331 A1* | 5/2007 | Venkateswaran et al. | 702/179 |
| 2009/0001268 A1 | 1/2009 | Tadano | |
| 2009/0031271 A1* | 1/2009 | White et al. | 716/10 |
| 2010/0218152 A1* | 8/2010 | Tehrani et al. | 716/6 |
| 2010/0287517 A1* | 11/2010 | Buss et al. | 716/6 |
| 2011/0077916 A1* | 3/2011 | Cohn et al. | 703/2 |

OTHER PUBLICATIONS

Cheng, L., et al. "Physically Justifiable Die-Level Modeling of Spatial Variation in View of Systematic Across Wafer Variability" IEEE Transactions on Computer-Aided Design of Integrated Circuits and Systems, vol. 30, No. 3. Mar. 2011. pp. 388-401.

Dong, C., et al. "Efficient SRAM Failure Rate Prediction Via Gibbs Sampling" Proceedings of the 48th Design Automation Conference, DAC 2011. Jun. 2011. pp. 200-205.

Drego, N., et al. "All-Digital Circuits for Measurement of Spatial Variation in Digital Circuits" IEEE Journal of Solid-State Circuits, vol. 45, No. 3. Mar. 2010. pp. 640-651.

Felt, E., et al. "Hierarchical Statistical Characterization of Mixed-Signal Circuits Using Behavioral Modeling" International Conference on Computer-Aided Design (ICCAD '96). Nov. 1996. (7 Pages).

Gautschi, W. "Numerical Analysis: An Introduction" Springer Science+Business Media, LLC. 1997, 2012. Second Edition. p. 178.

Gerstner, T. "Numerical Integration Using Sparse Grids" Numerical Algorithms. vol. 18. 1998. pp. 209-232.

Kanj, R., et al. "Mixture Importance Sampling and Its Application to the Analysis of SRAM Designs in the Presence of Rare Failure Events" Proceedings of the 43rd Design Automation Conference, DAC 2006. Jul. 2006. pp. 69-72.

Mangassarian, H., et al. "On Statistical Timing Analysis With Inter- and Intra-Die Variations" IEEE Computer Society 2005 Design, Automation and Test in Europe Conference and Exposition. vol. 1. Mar. 2005. (6 Pages).

Singhee, A., et al. "Statistical Blockade: A Novel Method for Very Fast Monte Carlo Simulation of Rare Circuit Events, and Its Application" 2007 Design, Automation and Test in Europe Conference and Exposition. Apr. 2007. (6 Pages).

Stine, B., et al. "Analysis and Decomposition of Spatial Variation in Integrated Circuit Processes and Devices" IEEE Transactions on Semiconductor Manufacturing, vol. 10, No. 1, Feb. 1997. pp. 24-41.

Sugg, M., et al. "Gauss-Krawtchouk Quadrature Approximations for Moments of Multinomial Type Distributions" Biometrika, vol. 63. No. 2. 1976. pp. 395-400.

Wann, C., et al. "SRAM Cell Design for Stability Methodology" 2005 IEEE VLSI-TSA International Symposium on VSLI Technology. Apr. 2005. pp. 21-22.

* cited by examiner

ANALYSIS OF CHIP-MEAN VARIATION AND INDEPENDENT INTRA-DIE VARIATION FOR CHIP YIELD DETERMINATION

RELATED APPLICATION INFORMATION

This application is a Continuation application of co-pending U.S. patent application Ser. No. 13/716,283 filed on Dec. 17, 2012, incorporated herein by reference in its entirety.

BACKGROUND

1. Technical Field

The present invention relates to the design and manufacture of integrated circuits, and more particularly to the determination of chip yields.

2. Description of the Related Art

Memory yield simulation techniques have traditionally only accounted for within-die independent random variation. However, chip mean variation (die-to-die) also has a significant effect on memory yield. Due to the prevalence and growing popularity of FinFET devices, the impact of chip mean variation in relation to random, within die variation on the memory yield of manufactured chips is likely to increase. Existing memory yield analysis methods cannot account for both chip mean variation and within die random variation. The yield analysis problem is a multimillion random variable problem when the independent random variations of all memory cells in an array are considered together with the chip mean variation of the array. Although the straightforward approach of using Monte Carlo simulation and the like can be employed to solve the problem, it would require significant processing resources to evaluate the integrand.

SUMMARY

One embodiment of the present principles is directed to a method for determining a chip yield. The method includes obtaining a first probability distribution function modeling variations within a chip and a second probability distribution function modeling variations between dies. Further, a discontinuous first level integration is performed with the first probability distribution function and a continuous second level integration is performed by a hardware processor based on the second probability function to determine the chip yield.

Another embodiment is also directed to a method for determining an array yield for a chip. In accordance with the method, sparse grid points are generated for a first set of random variables modeling variations between dies. For each of the sparse grid points, a cell yield is determined by solving a first level integration with a first probability distribution function modeling variations within the chip. Further, the array yield for the chip is computed, by a hardware processor, by solving a second level integration based on the determined cell yields.

Another embodiment is directed to a method for determining a chip yield. Here, a first probability distribution function modeling variations within a chip and a second probability distribution function modeling variations between dies are obtained. A first level integration problem based on the first probability distribution function is solved at a first level solver. In addition, the cell yield functions are transmitted from the first level solver through an interface to a second level solver. Further, a second level integration based on the cell yield functions is performed, by a hardware processor, at the second level solver, to determine the chip yield.

An alternative embodiment is directed to a system for determining a chip yield including a first level integration solver and a second level integration solver. The first level integration solver is configured to obtain a first probability distribution function modeling variations within a chip and to perform a discontinuous first level integration with the first probability distribution function. In addition, the second level integration solver is implemented by a hardware processor and is configured to perform a continuous second level integration based on a second probability distribution function modeling variations between dies to determine the chip yield.

Another embodiment is directed to a computer readable storage medium comprising a computer readable program for determining an array yield for a chip. The computer readable program when executed on a computer causes the computer to perform the steps of: generating sparse grid points for a first set of random variables modeling variations between dies; for each of the sparse grid points, determining a cell yield by solving a first level integration with a first probability distribution function modeling variations within the chip; and computing the array yield for the chip by solving a second level integration based on the determined cell yields.

Another embodiment is directed to a system for determining a chip yield. The system includes a first level integration solver, an interface and a second level integration solver. The first level integration solver is configured to solve a first level integration problem based on a first probability distribution function modeling variations within a chip and on random variables modeling variations between dies to compute cell yield functions. Further, the cell yield functions are transmittable through the interface. The second level integration solver is implemented by a hardware processor and is configured to receive the cell yield functions from the first level integration solver through the interface and to perform a second level integration based on the cell yield functions to determine the chip yield.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
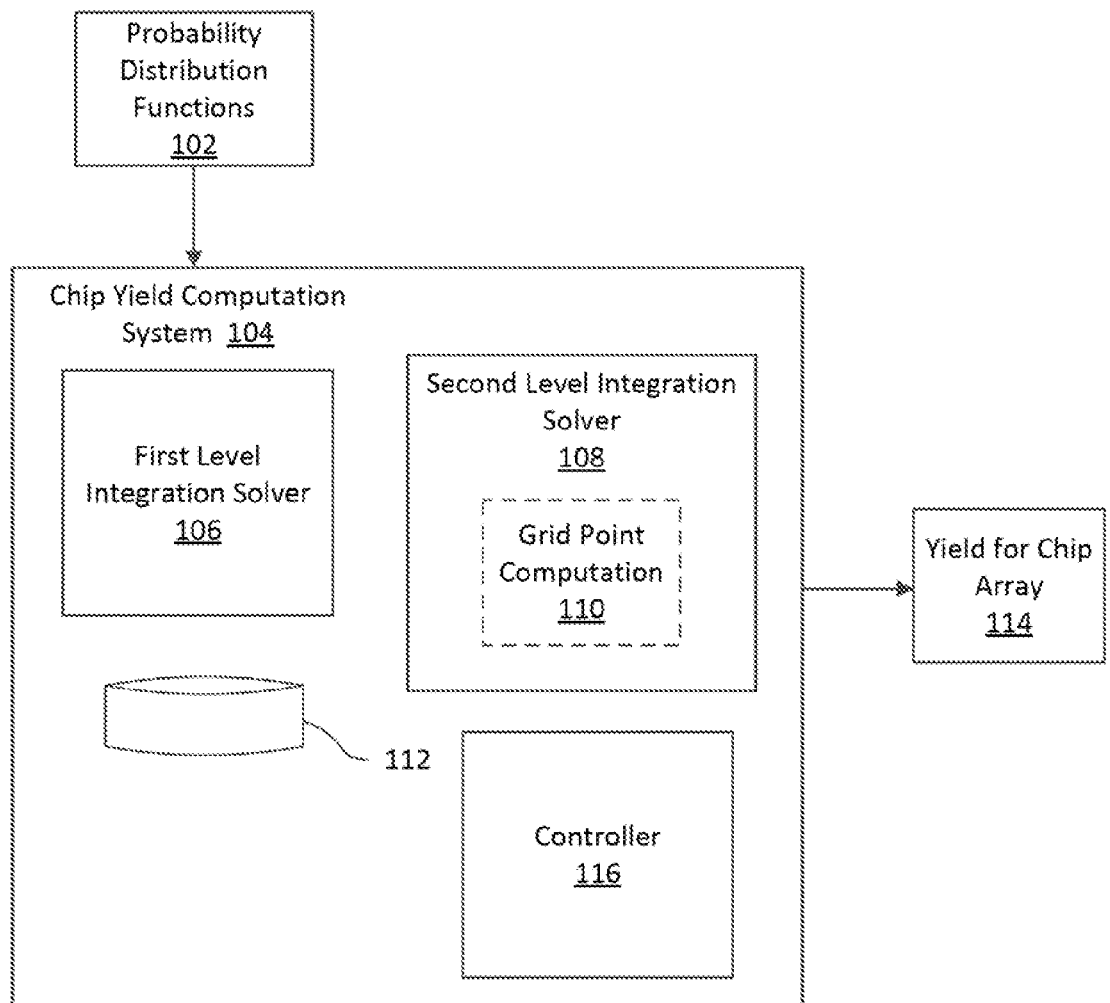
FIG. 1 is a high-level block diagram of a system for determining a chip yield in accordance with an exemplary embodiment of the present principles.

As noted above, chip mean variation has a substantial impact on memory yield. Further, to effectively and accurately evaluate memory or chip yield, both chip mean variation and within die random variation should be considered. Due to the fact that the problem involves the assessment of millions of random variables and the evaluation of a discontinuous integrand, an efficient method of solving the problem is needed. To address the problem, embodiments of the present principles reformulate the yield analysis into a two-level integration: a second level integration over only the chip mean variation parameters and an integration over the independent random variables for a single memory cell. The integrand in the second level integration is the result of the level 1 problem and is expensive to evaluate. However, surprisingly, the integrand is not strongly discontinuous and is amenable to numerical integration techniques that exploit smoothness. In accordance with one advantageous aspect, a stochastic collocation quadrature method on sparse grids can be utilized to solve the level 2 problem, as discussed herein below. For example, the sparse Gauss-Hermite quadrature method can be employed for Gaussian chip mean variation. The integrand of the level 1 integration is strongly discontinuous but relatively cheap to evaluate. Thus, techniques for yield analysis with only within-die random variations can be employed to solve the level 1 integration.

The reduction of the problem to a two-level integration problem as described herein is very efficient. The reduction reformulates a complex problem to two integrals that are each specifically tailored to relatively simple computation methods. Further, the resulting yield estimate is independent of the memory periphery and permits the efficient design of bit cells. In addition, applying the methods and systems described herein permits the incorporation of chip mean tolerance process specifications in design decisions of integrated circuits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As noted above, a memory array yield is a function of manufacturing variations. The variations can be modeled using a two-level hierarchical model: a) die to die or chip mean variation (CMV): m RVs, where "RVs" denote random variations and m is the number of RVs used to model CMV-type variation; and b) within die, device to device, independent random (R) variations: N×p RVs, where N is the number of cells in an array of a die, and p is the number of RVs used model R-type variation in a cell. Typically the number of total random variables in this problem would be tens of millions. In one example, N=10s of millions, p=6 (for example to denote one voltage threshold ($V_t$) per device in a six-transistor static random access memory (SRAM) cell), and m=3.

An array yield, as employed herein, is a percentage of manufactured arrays that are functional. As noted above, existing methods ignore the chip mean variation for computing memory yield estimates. In accordance with aspects of the present principles, the Yield Computation Problem can be formulated as follows. CMV random variables are defined as $y=\{y_1, \ldots, y_m\}$ and R random variables are defined as $x=\{x_{1,1}, \ldots, x_{1,p}, x_{2,1}, \ldots, x_{1,p}, \ldots x_{N,1}, \ldots, x_{N,p}\}$. As indicated above, y denotes random variables that model variations between dies, while x denotes random variables that model variations within a chip or die and between transistors and/or wires of an array of the chip or die. Further, a chip success function I(x,y) is defined as follows:

$$I(x, y) = \begin{cases} 1, & \text{if } array \text{ is functional at } x, y \\ 0, & \text{otherwise} \end{cases}$$

Accordingly, the array yield can be defined as $Y_{arr}=\int I(x,y)p(x,y)dxdy$, where p(x,y) is a probability distribution function for the set of all RVs.

As noted above, determining $Y_{arr}$ is a difficult numerical integration problem, as it is a multi-million random variable space and includes a discontinuous integrand, which would involve the use of expensive Monte Carlo type methods to find a solution. In particular, evaluation of I(x,y) is very expensive, as it involves a simulation of N (millions) SRAM cells.

In accordance with aspects of the present principles, the problem is reformulated as two-level integration problem with the level 1 integration including a discontinuous integrand that can be solved with a low processing cost, and a level 2 integration that involves the use of a somewhat expensive solving method, but includes a continuous integrand. Given that y is independent of x, and all variables in x are mutually independent, we have $$Y_{arr} = \int (Y_{cell}(y))^N p_y(y) dy$$

$$Y_{cell}(y) = \int I(x_1, y) p_{x1}(x_1) dx_1$$

$$I(x_1, y) = \begin{cases} 1, & \text{if cell is functional at } x_1, y \\ 0, & \text{otherwise} \end{cases}$$

where $p_{x1}(\ )$ and $p_y(\ )$ are the known joint probability distribution functions of $x_1$ and y. Here, the probability distribution function p(x,y) is reformulated as a first probability distribution function $p_{x1}(\ )$ that models variations within a chip, in particular, variations between elements within a cell in this example, and a second probability distribution function $p_y(\ )$ modeling variations between dies. $x_1=\{x_{1,1}, \ldots, x_{1,p}\}$ is the set of R type RVs for a single cell. For example, p=6 RVs in a 6 transistor SRAM cell, where we have one RV for the threshold voltage of each transistor. $p_{x1}(x_1)$ is the joint probability distribution function for this set of RVs. For example, if p=6 RVs, $p_{x1}(x_1)$ is a 6-dimensional function, such as a 6-dimensional Gaussian probability distribution function. $x=\{x_{1,1}, \ldots x_{1,p}, x_{2,1}, \ldots, x_{2,p}, \ldots, x_{n,1}, \ldots, x_{n,p}\}$ is the set of R type RVs for all N cells in the array. In other words, it is a collection of $x_1, x_2, x_3, \ldots, x_p$, where each $x_i$ is a set of p RVs. Given that all RVs in x are mutually independent, we have $p(x)=p_1(x_1) p_2(x_2) p_3(x_3) \ldots p_N(x_N)$ and $p_1(x_1)=p_2(x_2)=\ldots=p_N(x_N)$. Consequently, $p(x)=(p1(x_1))^N$. The cell success function $I_{cell}(x_1,y)$ nullifies the first probability distribution function at values of the random variables $x_1$, y if a cell fails at the values. $x_1$ denotes a set of random variables modeling variations within a given cell of a chip. The derivation of $Y_{arr}=\int(Y_{cell}(y))^N p_y(y)dy$ is as follows:

$$Y_{arr} = \int \left(\int I(x, y) p(x) dx\right) p_y(y) dy$$

$$= \int \left(\int I(x_1, y) I(x_2, y) \wedge I(x_N, y) p(x) dx\right) p_y(y) dy$$

$$= \int (Y_{cell}(y))^N p(y) dy,$$

where $x_i:\{x_{i,1}, K, x_{i,p}\}$

Referring now to the drawings in which like numerals represent the same or similar elements and initially to FIG. 1, an exemplary system 104 for determining a chip yield in accordance with an exemplary embodiment is illustratively depicted. The chip yield computation system 104 can include a first level integration solver 106 and a second level integration solver 108, which can in turn include a gird computation module 110, and a controller 116. The system 104 can receive a set of probability distribution functions 102, such as p(x,y) or $p_{x1}(x_1)$ and $p_y(y)$, and can output a yield 114 for a chip array, as discussed in more detail herein below. In addition, each of the solvers 106 and 108 and the controller 116 can be implemented by one or more processors configured to reference a storage medium 112 to implement method embodiments encoded in a program stored on the medium 112.

Figure 2:
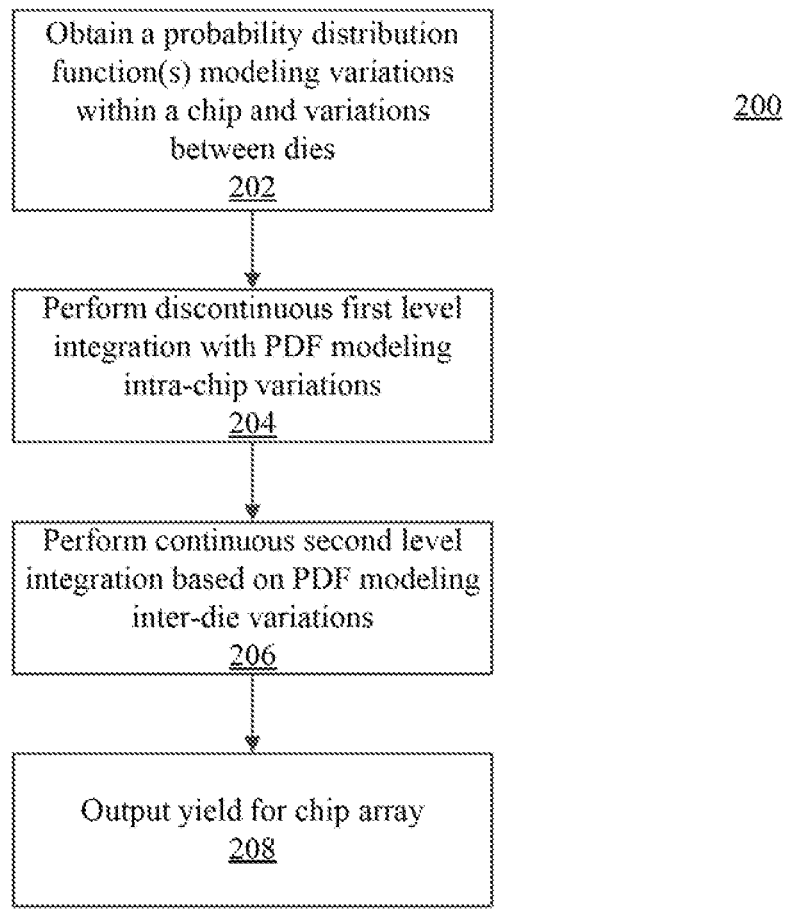
FIG. 2 is a high-level flow diagram of a method for determining a chip yield in accordance with an exemplary embodiment of the present principles.

FIG. 2 illustrates a flow diagram of an exemplary method 200 for determining a chip yield in accordance with an exemplary embodiment. The method can begin at step 202, at which the system 104 can obtain probability distribution functions modeling variations within a chip and variations between dies. For example, the system 104 can receive p(x,y) as an input and the controller 116 can be configured to derive $p_{x1}(x_1)$ and $p_y(y)$ from p(x,y). Alternatively, the $p_{x1}(x_1)$ and $p_y(y)$ can be obtained directly as an input 102. Thus, in either case, the first level integration solver 106 can obtain $p_{x1}(x_1)$ and the second level integration solver 108 can obtain $p_y(y)$.

At step 204, the first level integration solver 106 can perform a discontinuous first level integration with a probability distribution function that models variations within a chip, such as $p_{x1}(x_1)$. For example, the first level integration solver 106 can solve $Y_{cell}(y)=\int I(x_1,y)p_{x1}(x_1)dx_1$ through a variety of techniques. For example, the solver 106 can estimate the cell yield $Y_{cell}$ by employing Monte Carlo methods or boundary search based methods for the discontinuous integrand. Such boundary search methods include Importance Sampling, Statistical Blockade, Margin Computation, Gibbs Sampling and Particle Filters.

At step 206, the second level integration solver 108 performs a continuous second level integration based on a probability distribution function that models variations between dies, such as $p_y(y)$, to determine the chip yield. For example, the second level integration solver 108 can receive $Y_{cell}(y)$ determined at step 204 and can determine the chip yield $Y_{arr}$ by solving $Y_{arr}=\int (Y_{cell}(y))^N p_y(y)dy$. For example, the second level integration solver 108 can estimate the array yield $Y_{arr}$ by performing a stochastic collocation on sparse grids for y. The collocation coordinates for the random variables y can be generated by, for example, one of these schemes: Gauss-Hermite for Gaussian random variables or $[-\infty,\infty]$ range; Gauss-Legendre for Uniform random variables or [a,b] (a,b are finite) range; Gauss-Laguerre for Gamma RVs or $[0,\infty]$ range; Gauss-Jacobi for Beta RVs; Gauss-Krawtchouk for Binomial RVs; Gauss-Chebyshev for [a,b] (a,b are finite) range. Further, the sparse grid can be generated by combining the one-dimensional collocation coordinates as per Smolyak's rule.

At step 208, the second level integration solver 108 can output the yield 114 determined for the chip array at step 206.

Figure 3:
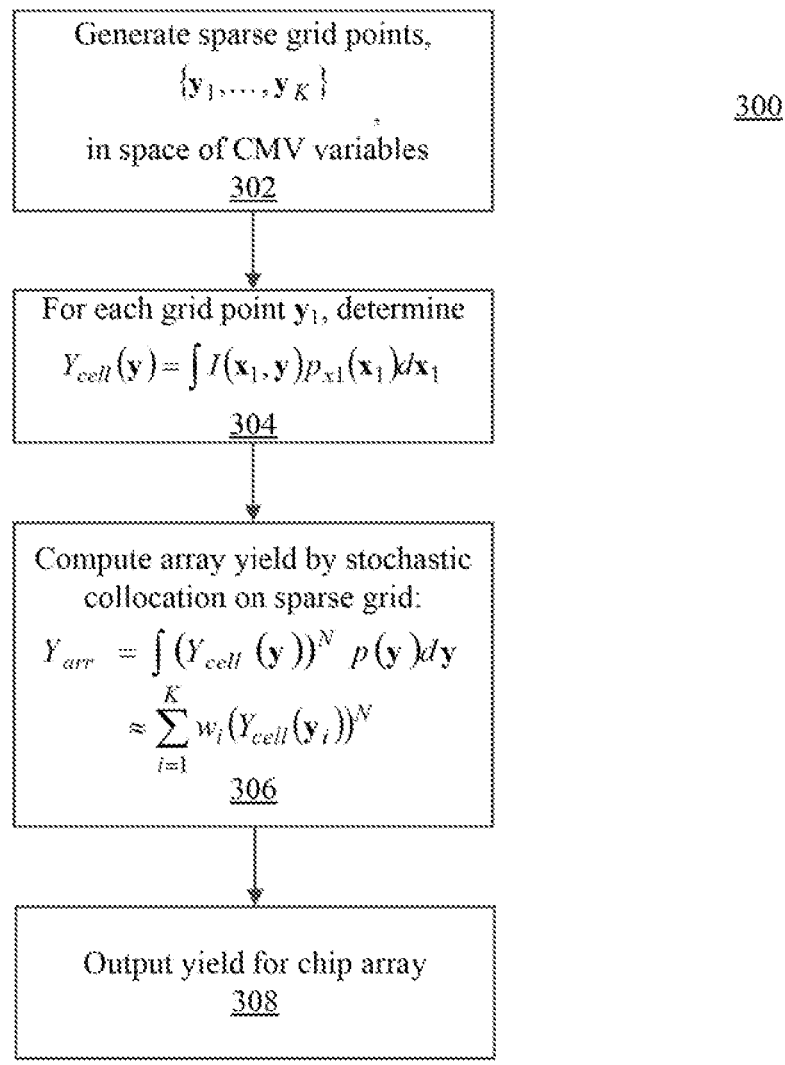
FIG. 3 is a high-level flow diagram of a more specific method for determining a chip yield in accordance with an exemplary embodiment of the present principles.

With reference now to FIG. 3, with continuing reference to FIGS. 1 and 2, a more specific method 300 for determining a chip yield in accordance with an exemplary embodiment is illustratively depicted. It should be understood that the aspects of the method 300 described herein can be incorporated into the method 200 to determine the chip yield. The method 300 can begin at step 302, at which the grid point computation module 110 of the second level integration solver 108 can generate sparse grid points for a set of random variables modeling variations between dies. For example, the grid point computation module 110 can generate sparse grid points $\{y_1, \ldots, y_K\}$ in the space of the CMV variables as discussed above with respect to step 206. Given a value of 'm' (number of CMV RVs), the chosen sparse grid point generation scheme (e.g. Gauss-Hermite with Smolyak rule) will generate 'K' points in the m-dimensional space of CMV RVs. This K depends on the value of 'in' and the chosen sparse grid point generation scheme.

At step 304, for each of the sparse grid points, the first level integration solver 106 can determine a cell yield by solving a first level integration with a probability distribution function modeling variations within the chip. For example, for each $y_i$, first level integration solver 106 can evaluate the cell yield $Y_{cell}(y_i)$ using a Monte Carlo or boundary search based technique, such as importance sampling, to solve $Y_{cell}(y)=\int I(x_1,y)p(x_1)dx_1$, as discussed above with respect to step 204.

At step 306, the second level integration solver 108 can compute the array yield for the chip by solving a second level integration based on the determined cell yields. For example, the second level integration solver 108 can compute the array yield accounting for CMV by performing stochastic collocation on the sparse grid to solve $$Y_{arr} = \int (Y_{cell}(y))^N p(y)dy \approx \sum_{i=1}^{K} w_i(Y_{cell}(y_i))^N$$

where $w_i$ are quadrature weights and $y_i$ are sparse grid quadrature points. Thus, here, the second level integration solver 108 can perform a summation over the sparse grid points based on the cell yields.

At step 308, the second level integration solver 108 can output the yield determined for the chip array at step 306.

Figure 4:
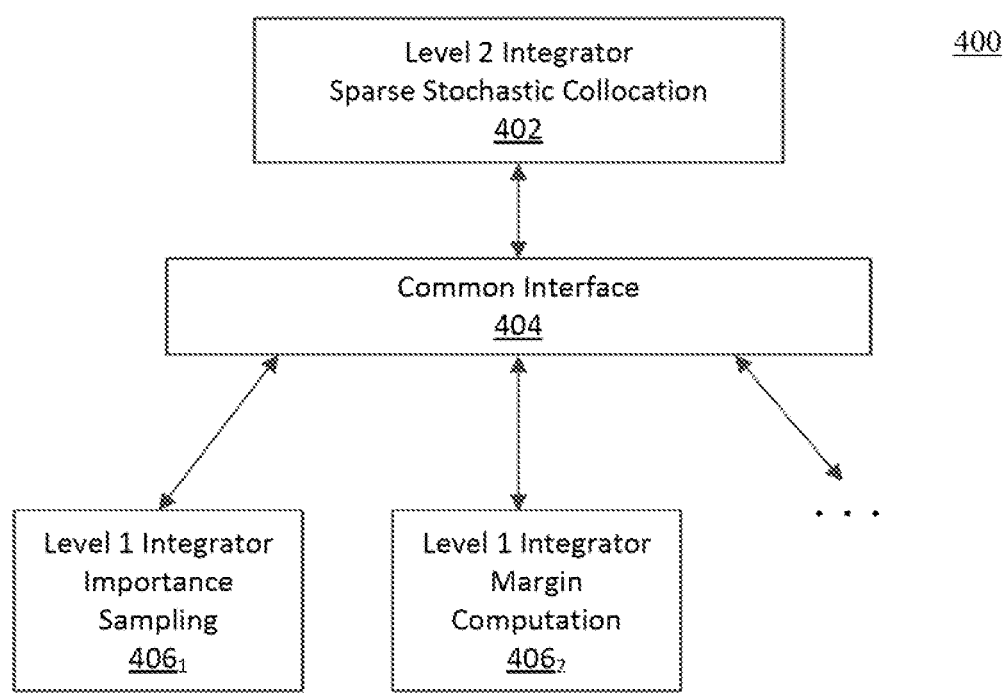
FIG. 4 is a high-level block diagram of a modular system for determining a chip yield in accordance with an exemplary embodiment of the present principles.

With reference now to FIG. 4, with continuing reference to FIG. 1, a more specific embodiment 400 of the system 104 for determining a chip yield is illustratively depicted. In the system 400, the two levels of integration are solved independently using separate program modules that interact via a standard interface. For example, the system 400 includes a level 2 integrator or integration solver 402 that performs the level 2 integration based on sparse stochastic collocation in accordance with the method 200 or 300, described above, and communicates with one or more level 1 integration solvers through a common interface 404. The program that performs the level 1 integration can be implemented in one of a plurality of modules. Here, in this example, the system 400 can include a plurality of modules, such as a level 1 integrator or integration solver $406_1$, which implements importance sampling, a level 1 integrator or integration solver $406_2$, which implements margin computation, among other level 1 integrator or integration solvers that can additionally be included in the system 400. Indeed, each of the level 1 integration methods described above with respect to step 204 can respectively be implemented in a level 1 integrator or integration solver that can be included in the system 400 and can be configured to interact with the level 2 integration solver 402 through the common interface 404. Here, any of the level 1 integration solvers can submit the level 2 integration problem to a separate program via the standard interface. In the system 400, arbitrary level 1 integrators can be used with the same level 2 integrator. The modular design of the system 400 enables changes/upgrades to the level 1 and level 2 yield estimation solvers.

Figure 5:
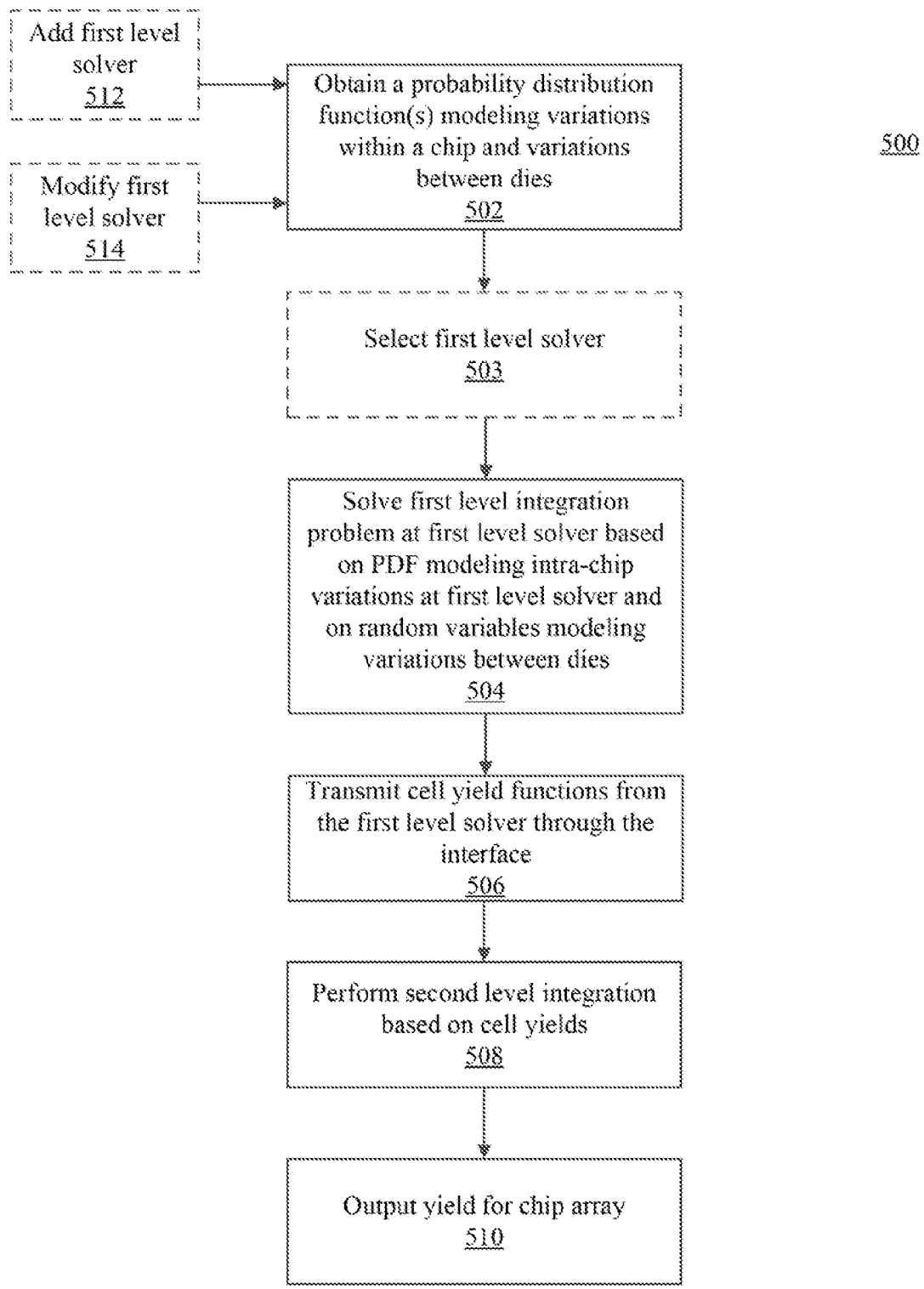
FIG. 5 is a high-level flow diagram of a method for determining a chip yield using a modular system in accordance with an exemplary embodiment of the present principles.

Referring now to FIG. 5, with continuing reference to FIGS. 2-4, a method 500 for determining a chip yield in accordance with an exemplary embodiment is illustratively depicted. In particular, the method 500 can be implemented in the system 400. The method 500 can begin at step 502, at which the system 400 can obtain a first probability distribution function modeling variations within a chip and a second probability distribution function modeling variations between dies. For example, the level 2 integration solver 402 can obtain $p_y(y)$ and one or more of the plurality of level 1 integration solvers, such as solvers $406_1$ and $406_2$, can obtain $p_{x1}(x_1)$ as discussed above with respect to step 202.

Optionally, if there are a plurality of available level 1 solvers in the system 400, at step 503, the level 2 integration solver 402 can select one of the plurality of level 1 level 2 integration solvers, such as solvers $406_1$ and $406_2$, to perform the level 1 integration described above. For example, the level 2 integration solver 402 can obtain the function $p_{x1}(x_1)$ and can select, based on pre-stored criteria, a level 1 integration solver that is best suited to solve $p_{x1}(x_1)$.

At step 504, the (optionally selected) level 1 integration solver can solve a first level integration problem based on the first probability distribution function. For example, the level 1 integration solver can solve $Y_{cell}(y)=\int I(x_1,y)p(x_1)dx_1$, as discussed above with respect to step 204 or 304.

At step 506, the level 1 integration solver can transmit the determined cell yield function, such as $Y_{cell}(y)$, to the level 2 integration solver 402 through the common interface 404. Here, the level 2 integration solver can receive the determined cell yield function through the interface 404 from any of the level 1 solvers that determine the cell yield function at step 504, including, for example, solvers $406_1$ and $406_2$.

At step 508, the level 2 integration solver 402 can perform second level integration based on the cell yields received at step 506 to determine the chip yield. For example, level 2 integration solver 402 can determine a yield for the array of a chip as discussed above with respect to steps 206 and/or 306.

At step 510, the level 2 integration solver 402 can output the yield determined for the chip array at step 508.

It should be noted that the modular design of system 400 enables changes/upgrades to the level 1 yield estimation method. For example, the method 500 can include adding, at optional step 512, a first level solver, such as solvers based on any of the enumerated methods described above at step 204. In addition, the method 500 can including modifying, for example updating, at optional step 514, one or more of a plurality of first level solvers in the system 400 with which the second level solver 402 can interact through the common interface 404. The controller 116 can be configured to add and/or modify a first level solver at the direction of a user at optional steps 512 and 514.

Figure 6:
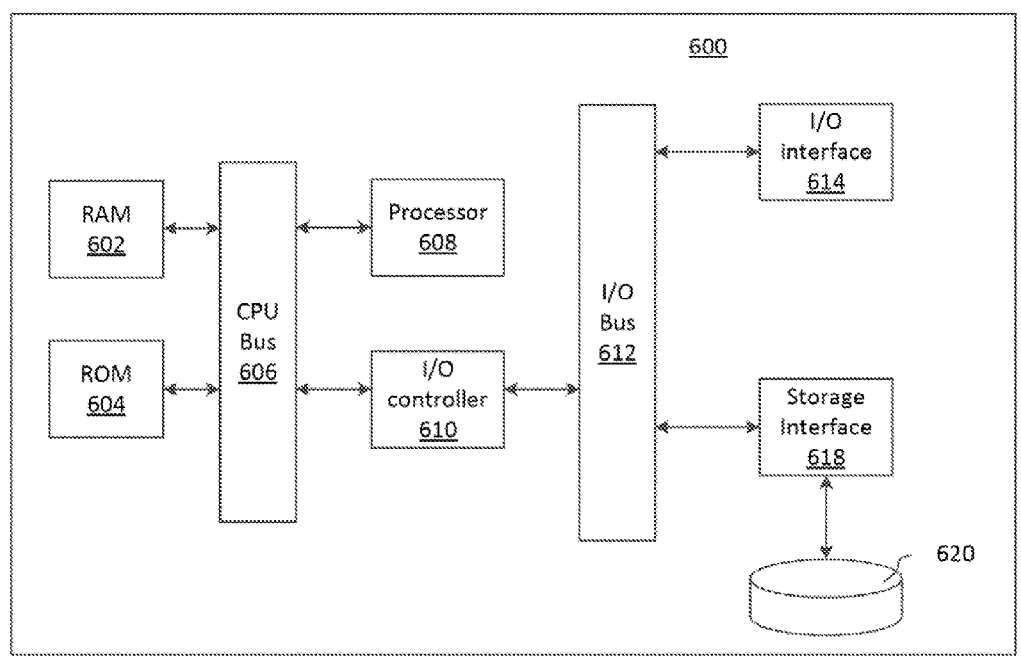
FIG. 6 is a high-level block diagram of a computing system by which method and system embodiments of the present principles can be implemented.

With reference now to FIG. 6, an exemplary computing system 600 in which system embodiments of the present principles described above can be implemented, and by which method embodiments of the present principles described above can be implemented, is illustrated. The computing system 600 includes a hardware processor 608 that can access random access memory 602 and read only memory 604 through a central processing unit bus 606. In addition, the processor 608 can also access a storage medium 620 through an input/output controller 610, an input/output bus 612 and a storage interface 618, as illustrated in FIG. 6. For example, the probability distribution functions 102 can be stored in and accessed form the storage medium 620. The system 600 can also include an input/output interface 614, which can be coupled to a display device, keyboard, mouse, touch screen, external drives or storage mediums, etc., for the input and output of data to and from the system 600. For example, the probability distribution functions 102 described above can be input into the system 600 through the interface 614 and the determined chip yields 114 can be output from the system 600 through the interface 614. In accordance with one exemplary embodiment, the processor 608 can access software instructions stored in the storage medium 620 and can access memories 602 and 604 to run the software and thereby implement methods 200, 300 and/or 500 described above. In addition, the processor 608 can implement each of the system elements described above, such as the first level integration solvers 106, $406_1$ and/or $406_2$, and the second level integration solvers 108 and/or 402. Alternatively, each of these system elements can be implemented via a plurality of processors 608.

Having described preferred embodiments of systems and methods for analysis of chip-mean variation and independent intra-die variation for chip yield determination (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for determining a chip yield comprising:
   a first level integration solver configured to obtain a first probability distribution function modeling variations within a chip and to perform a discontinuous first level integration with the first probability distribution function; and
   a second level integration solver, implemented by a hardware processor, configured to perform a continuous second level integration based on a second probability distribution function modeling variations between dies to determine the chip yield, wherein a solution of the first probability distribution function modeling variations within the chip is a variable for solving the second probability distribution function.

2. The system of claim 1, wherein the first probability distribution function is based on a first plurality of random variables and wherein the second probability distribution function is based on second plurality of random variables.

3. The system of claim 2, wherein the first plurality of random variables account for variations between elements of an array of the chip.

4. The system of claim 2, wherein the first level integration is based on a chip success function that nullifies the first probability distribution function at values of the first and second pluralities of random variables if a cell fails at said values.

5. The system of claim 1, wherein the first level integration solver is configured to perform the discontinuous first level integration by implementing a Monte Carlo method.

6. The system of claim 1, wherein the first level integration solver is configured to perform the discontinuous first level integration by implementing a boundary search method.

7. The system of claim 1, wherein the second level integration solver is configured to perform the continuous second level integration by performing a stochastic collocation.

8. The system of claim 7, wherein the stochastic collocation is based on a sparse grid for random variables upon which the second probability distribution function is based.

* * * * *